United States Patent
Asuncion et al.

(10) Patent No.: US 8,995,514 B1
(45) Date of Patent: Mar. 31, 2015

(54) METHODS OF AND CIRCUITS FOR ANALYZING A PHASE OF A CLOCK SIGNAL FOR RECEIVING DATA

(71) Applicant: Xilinx, Inc., San Jose, CA (US)

(72) Inventors: Santiago G. Asuncion, San Ramon, CA (US); Mustansir Fanaswalla, Los Gatos, CA (US); Vaibhav Kamdar, Campbell, CA (US); Brandon L. Fernandes, Santa Clara, CA (US); Jayesh Patil, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 113 days.

(21) Appl. No.: 13/630,144

(22) Filed: Sep. 28, 2012

(51) Int. Cl.
*H04B 3/46* (2006.01)

(52) U.S. Cl.
USPC .......................... 375/226; 375/327

(58) Field of Classification Search
CPC ... H04L 7/0331; H04L 7/0337; H04L 7/0334; H04L 1/205; G01R 13/31711; G01R 31/31711; G01R 31/31725; G01R 31/31727; G01R 31/31709; G01R 31/3173
USPC ......... 375/224, 226, 252, 294, 326, 327, 355, 375/371, 376
See application file for complete search history.

(56) References Cited

U.S. PATENT DOCUMENTS

| | | | |
|---|---|---|---|
| 6,701,269 B1 * | 3/2004 | Jungerman et al. | 702/106 |
| 6,728,311 B1 * | 4/2004 | Waschura et al. | 375/224 |
| 7,308,060 B1 * | 12/2007 | Wall et al. | 375/355 |
| 7,782,932 B2 * | 8/2010 | Payne et al. | 375/224 |
| 7,822,110 B1 * | 10/2010 | Doblar | 375/224 |
| 8,081,723 B1 * | 12/2011 | Ding et al. | 375/355 |
| 8,219,846 B2 * | 7/2012 | Feng | 713/503 |
| 8,694,837 B1 * | 4/2014 | Qian et al. | 714/704 |
| 2002/0126784 A1 * | 9/2002 | Brazeau et al. | 375/371 |
| 2003/0007222 A1 * | 1/2003 | Kwasaki et al. | 359/189 |
| 2003/0128021 A1 * | 7/2003 | Tan et al. | 324/121 E |
| 2003/0174789 A1 * | 9/2003 | Waschura et al. | 375/340 |
| 2003/0225541 A1 * | 12/2003 | Abramovitch | 702/127 |
| 2004/0024547 A1 * | 2/2004 | Nygaard, Jr. | 702/67 |
| 2004/0153266 A1 * | 8/2004 | Nygaard, Jr. | 702/68 |
| 2004/0225460 A1 * | 11/2004 | Nygaard, Jr. | 702/67 |
| 2005/0108600 A1 * | 5/2005 | Arguelles | 714/701 |
| 2005/0169638 A1 * | 8/2005 | Tayebati et al. | 398/159 |
| 2005/0235189 A1 * | 10/2005 | Choi | 714/746 |
| 2005/0246601 A1 * | 11/2005 | Waschura | 714/724 |
| 2005/0259764 A1 * | 11/2005 | Hung Lai et al. | 375/317 |
| 2006/0190200 A1 * | 8/2006 | Nygaard, Jr. | 702/68 |
| 2006/0256847 A1 * | 11/2006 | Nygaard, Jr. | 375/224 |
| 2007/0047680 A1 * | 3/2007 | Okamura | 375/348 |
| 2007/0160173 A1 * | 7/2007 | Takeuchi | 375/355 |
| 2008/0013456 A1 * | 1/2008 | Hafed | 370/241 |
| 2008/0069196 A1 * | 3/2008 | Choi | 375/231 |

(Continued)

OTHER PUBLICATIONS

U.S. Appl. No. 13/100,053, filed May 3, 2011, Asuncion et al.

(Continued)

*Primary Examiner* — Emmanuel Bayard
(74) *Attorney, Agent, or Firm* — John J. King

(57) ABSTRACT

A method of analyzing a phase of a clock signal for receiving data is described. The method comprises identifying an end of an eye pattern associated with received data; testing points along a contour of the eye pattern to establish a margin for an opening of the eye pattern; and determining whether a phase of the clock signal is acceptable for receiving the received data. A circuit for analyzing a phase of a clock signal for receiving data is also described.

20 Claims, 8 Drawing Sheets

(56) References Cited

U.S. PATENT DOCUMENTS

| | | | |
|---|---|---|---|
| 2008/0175310 A1* | 7/2008 | Okamura et al. | 375/232 |
| 2008/0192814 A1* | 8/2008 | Hafed et al. | 375/224 |
| 2009/0002082 A1 | 1/2009 | Menolfi et al. | |
| 2009/0019326 A1 | 1/2009 | Boudon et al. | |
| 2009/0196387 A1* | 8/2009 | McCune, Jr. | 375/355 |
| 2010/0023826 A1* | 1/2010 | Noguchi | 714/746 |
| 2010/0027606 A1 | 2/2010 | Dai et al. | |
| 2010/0080421 A1* | 4/2010 | Tsubamoto et al. | 382/106 |
| 2010/0097087 A1* | 4/2010 | Hogeboom et al. | 324/763 |
| 2010/0329325 A1* | 12/2010 | Mobin et al. | 375/232 |
| 2011/0242333 A1* | 10/2011 | Zhu et al. | 348/194 |
| 2011/0292990 A1* | 12/2011 | Flynn et al. | 375/229 |
| 2011/0293285 A1* | 12/2011 | Aronson et al. | 398/135 |
| 2011/0311009 A1* | 12/2011 | Flynn et al. | 375/354 |
| 2012/0072784 A1 | 3/2012 | Li et al. | |
| 2012/0114023 A1* | 5/2012 | Mobin et al. | 375/219 |
| 2012/0201289 A1 | 8/2012 | Abdalla et al. | |
| 2013/0279551 A1* | 10/2013 | Fujimori et al. | 375/219 |
| 2014/0211839 A1* | 7/2014 | Mobin et al. | 375/233 |

OTHER PUBLICATIONS

George, Donald A. et al., "An Adaptive Decision Feedback Equalizer" *IEEE Transactions on Communication Technology*, Jun. 1971, pp. 281-293, vol. Com-19, No. 3, IEEE , Piscataway, New Jersey, USA.

* cited by examiner

METHODS OF AND CIRCUITS FOR ANALYZING A PHASE OF A CLOCK SIGNAL FOR RECEIVING DATA

FIELD OF THE INVENTION

One or more embodiments generally relate to integrated circuits, and more particularly to methods of and circuits for analyzing a phase of a clock signal for receiving data.

BACKGROUND

A high-speed serial receiver samples incoming data symbols at some phase of the high-speed clock generated from a phase-locked loop (PLL). The PLL uses a reference clock to produce the high-speed clock. The edge transitions (i.e., the recovered clock) between incoming data symbols can be recovered using the high-speed clock. To properly sample the incoming data symbols, the receiver should sample the incoming data symbols between the edge transitions in the stream of incoming data symbols. The range of sampling phases for which the high-speed serial receiver properly recovers the incoming data symbols gives the margin for the sampling phase.

To check that the data symbols actually captured by the high-speed serial receiver match the data symbols that the external test equipment transmits to the high-speed serial receiver, the captured data symbols must be looped back to the external test equipment. However, it is time consuming and difficult to determine the margin of the sampling phase because external test equipment is required and because the tested receiver must generally include a transmitter supporting a loopback mode for returning the captured data symbols. Further, in order to determine whether a phase of a clock signal is acceptable for receiving data, numerous points must be checked. These numerous points must be checked for each phase of a plurality of available phases which could be used for receiving data. The requirement to check many points for a number of phases of a clock signal further increases the testing time for a receiver.

SUMMARY

A method of analyzing a phase of a clock signal for receiving data is described. The method comprises identifying an end of an eye pattern associated with received data; testing points along a contour of the eye pattern to establish a margin for an opening of the eye pattern; and determining whether a phase of the clock signal is acceptable for receiving the received data.

Another method of analyzing a phase of a clock signal for receiving data comprises scanning points along a time axis of a voltage versus time plot to identify a first end of an eye pattern; scanning points along the time axis of the voltage versus time plot to identify a second end of the eye pattern; determining whether a phase of the clock signal is acceptable for receiving data; scanning points along a voltage axis of the voltage versus time plot to identify a first voltage of the eye pattern; scanning points along the voltage axis of the voltage versus time plot to identify a second voltage of the eye pattern; and determining a voltage variation of received data.

A circuit for analyzing a phase of a clock signal for receiving data is also described. The circuit comprising a circuit generating a phase of a clock signal; and a clock and data recovery circuit coupled to receive data and the phase of the clock signal, the clock and data recovery circuit enabling identifying an end of an eye pattern, and testing points along a contour of the eye pattern to determine whether the phase of the clock signal is acceptable for receiving data.

DETAILED DESCRIPTION OF THE DRAWINGS

Figure 1:
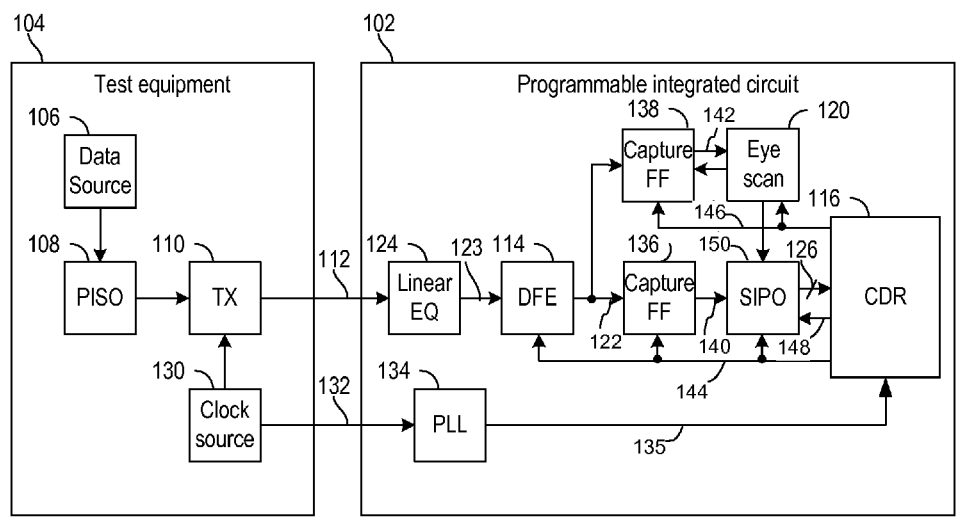
FIG. 1 is a block diagram of a synchronous communication characterization circuit.

When the analog values and transitions of received data symbols are accumulated and displayed over a unit interval (UI), the resulting display is denoted as an "internal eye diagram" or "eye pattern" because the rising and falling transitions at the beginning and end of the unit interval frame the general shape of an open eye. The eye pattern gives the margin of the sampling phase by indicating the time between the two ends of the signal for receiving the data, and enables selection of an operating point with an optimum margin.

A contour eye-scan can enable the evaluation of data received at points along a voltage versus time plot on the boundary or contour of an eye pattern for a given phase of a clock signal. With the contour eye-scan, it is assumed that all the points inside the eye pattern are passing points. That is, the points at the center of the eye will be determined to be valid according to some criterion such as a bit error rate. This assumption can be made because the points on the contour of the eye pattern are the ones which are subjected to high jitter. For example, points on the contour of the eye pattern are subjected to either data transition and/or amplitude variation, whereas the points towards the center of the eye pattern are more stable sampling points. Therefore, the probability of error sampling on the edge of the eye pattern is high, while the probability of error sampling inside the eye pattern is very low. A contour scanning can reduce the number of points required to be scanned compared to traditional eye-scan methods, thus providing lower test time and greater test coverage. It also validates the optimum position where the CDR is sampling data. Further, contour eye-scan will give approximately the same level of confidence but reduced test time in identifying an opening of the eye pattern compared to a traditional eye-scan.

The "internal eye diagram" of the serial receiver and the margin of the sampling phase can be determined. Further, upstream circuits can be characterized according to the eye opening of the eye pattern. Some of the upstream components include, without limitation, termination resistors, a Continuous Time Linear Equalizer (CTLE) circuit and an Automatic Gain Control (AGC) circuit. The contour eye-scan allows characterization, validation and optimization of these components in terms of the opening of the eye pattern. This technique provides the ability to characterize an upstream circuit such as a linear equalizer using the determined optimum operating point, to enable in-circuit characterization and dynamic tuning of a receiver in an end-user application, and to improve production screening of the receivers within programmable integrated circuits.

An internal eye-scan measurement of the eye pattern at the receiver can be implemented using Bit Error Rate (BER) testing inside a programmable integrated circuit. An internal eye-scan implementing a contour eye-scan is a receiver margin test where the measurements and calculations are performed within the integrated circuits. The internal eye-scan measurements can provide direct measurements at the receiver, reduce test time, and eliminate expensive test equipment by eliminating the requirement to provide data back to the test equipment.

Turning first to FIG. 1, a block diagram of a synchronous communication characterization circuit is shown. To characterize a receiver in programmable integrated circuit 102, external test equipment 104 provides test inputs to the receiver. A data source 106 of test equipment 104 generates a parallel data pattern including a series of words, and the parallel-in serial-out (PISO) buffer 108 serializes the parallel data pattern into a sequence of binary symbols. Transmitter 110 of test equipment 104 serially transmits the sequence of binary symbols on the communication signal on line 112. The communication signal on line 112 can be a communication channel including a differential pair of signals, for example. Test equipment 104 can add sinusoidal jitter (SJ) or bounded uncorrelated jitter (BUJ) to test for receiver margin.

The programmable integrated circuit 102 implements a receiver coupled to the transmitter 110 via the communication signal on line 112. The receiver includes a decision feedback equalizer (DFE) circuit 114, a clock and data recovery (CDR) circuit 116, and an eye-scan controller 120. The DFE circuit 114 generates a filtered signal on line 122 from a signal 123 representing the first pass of filtering by the linear equalizer 124. The filtered signal on line 122 is a sum of the communication signal on line 123 and a variable weighting of a binary symbol recently sampled. The receiver includes the first level of filtering, the linear equalizer 124, that attenuates low frequencies and/or amplifies high frequencies.

Capture flip-flop 136 and 138 sample the filtered signal, where path 140 is the mission path and 142 is the replica path. In the replica path, capture flip-flop 136 is controlled by eye-scan circuit 120 for margin measurements.

PLL 134 provides the high speed clock 135. The CDR circuit 116 provides high speed clock signals 144 and 146 having controllable delays. A clock signal 148 is the parallel clock for a single in, parallel out (SIPO) buffer 150. The CDR circuit 116 provides clock signals 140, which is a selected phase relative to the clock signal 135, provided by the PLL 134, for sampling the filtered signal on line 122. The selected phase is such that the serial data stream on line 112 is aligned to the recovered clock. The serial-in parallel-out buffer 150 deserializes the received sequence of sampled binary symbols on line 126 into a series of received words. A clock signal 148 is the parallel clock for the SIPO. The CDR circuit 116 provides a selected phase relative to a clock signal for sampling the filtered signal on line 122. The selected phase is such that the serial stream is aligned to the recovered clock.

The clock source 130 of test equipment 104 provides the clock signal on line 132, and the transmitter 110 of test equipment 104 serially transmits the transmitted sequence of binary symbols in synchronization with the clock signal on line 132. A PLL 134 generates a clock signal 135 which generally matches the phase of the clock signal on line 132, and generates a clock signal that is synchronous with the transitions of the communication signal on line 112. The CDR circuit 116 varies the phase of the clock signal 135 from PLL 134 to sample the received sequence of sampled binary symbols using capture flip-flops 136 and 138. The eye-scan circuit 120 and the CDR circuit 116 will enable margin measurements to receive data, as is described in more detail below.

Figure 2:
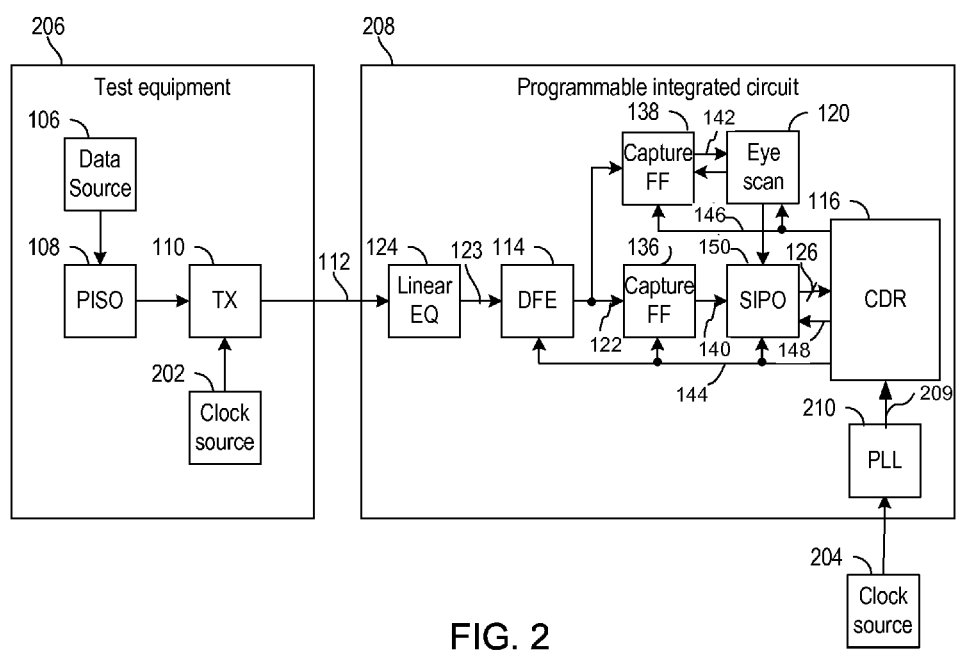
FIG. 2 is a block diagram of an asynchronous communication characterization circuit.

Turning now to FIG. 2, a block diagram of an asynchronous communication characterization circuit is shown. While FIG. 1 has a single clock source 130 for both the test equipment 104 and the receiver in programmable integrated circuit 102, FIG. 2 instead has separate clock sources 202 and 204 for the test equipment 206 and the programmable integrated circuit 208, respectively. A remote oscillator of clock source 202 and a local oscillator of clock source 204 can have plesiochronous frequencies with respective tolerance drifts from the same nominal frequency.

Because test equipment 206 transmits symbols that are asynchronous to a clock signal 209 from PLL 210, the CDR circuit 116 cannot successfully sample the transmitted symbols at a fixed phase of the clock signal 209 from PLL 210. Instead, the CDR circuit 116 aligns a variable phase with the transitions between the transmitted symbols, and samples about halfway between the transitions during normal operation. In an exemplary circuit with plesiochronous frequencies for clock sources 202 and 204, the variable sampling phase is often monotonically increasing or monotonically decreasing at a rate equaling the frequency difference between clock sources 202 and 204. Other than the differences discussed above, the asynchronous communication characterization circuit of FIG. 2 operates similarly to the synchronous communication characterization circuit of FIG. 1.

In another example, a synchronous communication characterization circuit includes a receiver that directly recovers a clock signal from the transmitted symbols without receiving a clock signal from a remote or local oscillator. In one example, the receiver includes a PLL that generates a clock signal having transitions locked in phase with the transitions between the transmitted symbols, where an eye-scan controller varies a sampling phase of the generated clock signal on the replica path.

Figure 3:
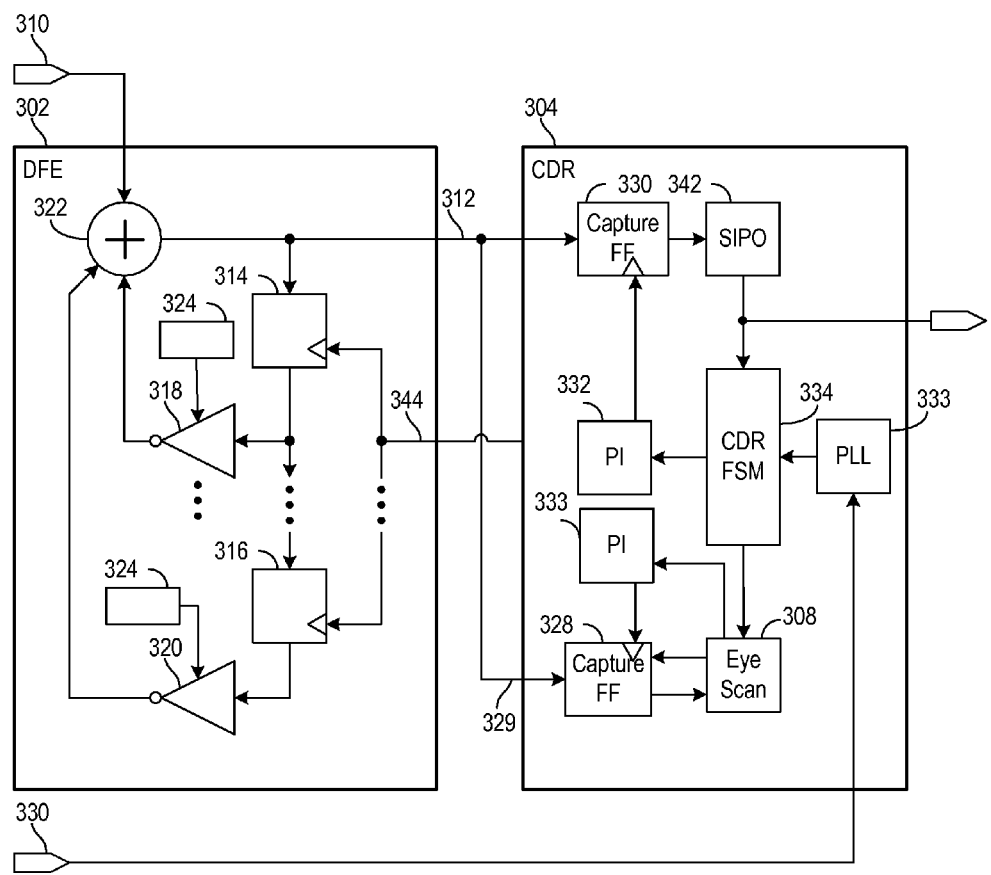
FIG. 3 is a block diagram of circuit for characterizing a receiver.

FIG. 3 is a block diagram of circuit for performing a contour eye-scan and characterizing a receiver. The circuit includes a decision feedback equalizer (DFE) circuit 302 and a clock and data recovery (CDR) circuit 334, capture flip-flops 328 and 330, and an eye-scan controller 308. The circuit of FIG. 3 could be implemented in either of the circuits of FIG. 1 or 2, for example.

The DFE circuit 302 is coupled to a communication signal 310, and is configured to generate a filtered signal on line 312. The DFE circuit 302 can include a serial shifter having registers 314 through 316, for example. Register 314 at a beginning of the serial shifter samples a symbol directly from the filtered signal on line 312, and each register 316 stores a less recently sampled symbol. The registers 314 through 316 are coupled to respective amplifiers 318 through 320. The respective amplifier 318 through 320 for each register 314 through 316 has a variable gain that scales the respective recently sampled symbol stored in the register by a respective weighting. The summing circuit 322 generates the filtered signal on line 312 that is a sum of the communication signal 310 and the outputs from the amplifiers 318 through 320. Thus, the DFE circuit 302 is configured to generate the filtered signal on line 312 that is the sum of the communication signal 310 and respective weightings of the recently sampled symbols stored in registers 314 through 316.

During normal operation, the negative feedback from the recently sampled symbols stored in registers 314 through 316 compensates for inter-symbol interference and for attenuation of the high-frequency components of the communication signal 310. In one exemplary circuit, only the most recently sampled symbol stored in register 314 is used to characterize the receiver, while feedback from the remaining recently sampled symbols is disabled during receiver characterization by setting each weight register 324 to zero. Thus, for characterization of the receiver, the filtered signal on line 312 is a sum of the communication signal 310 and the most recently sampled symbol from register 314.

Figure 4:
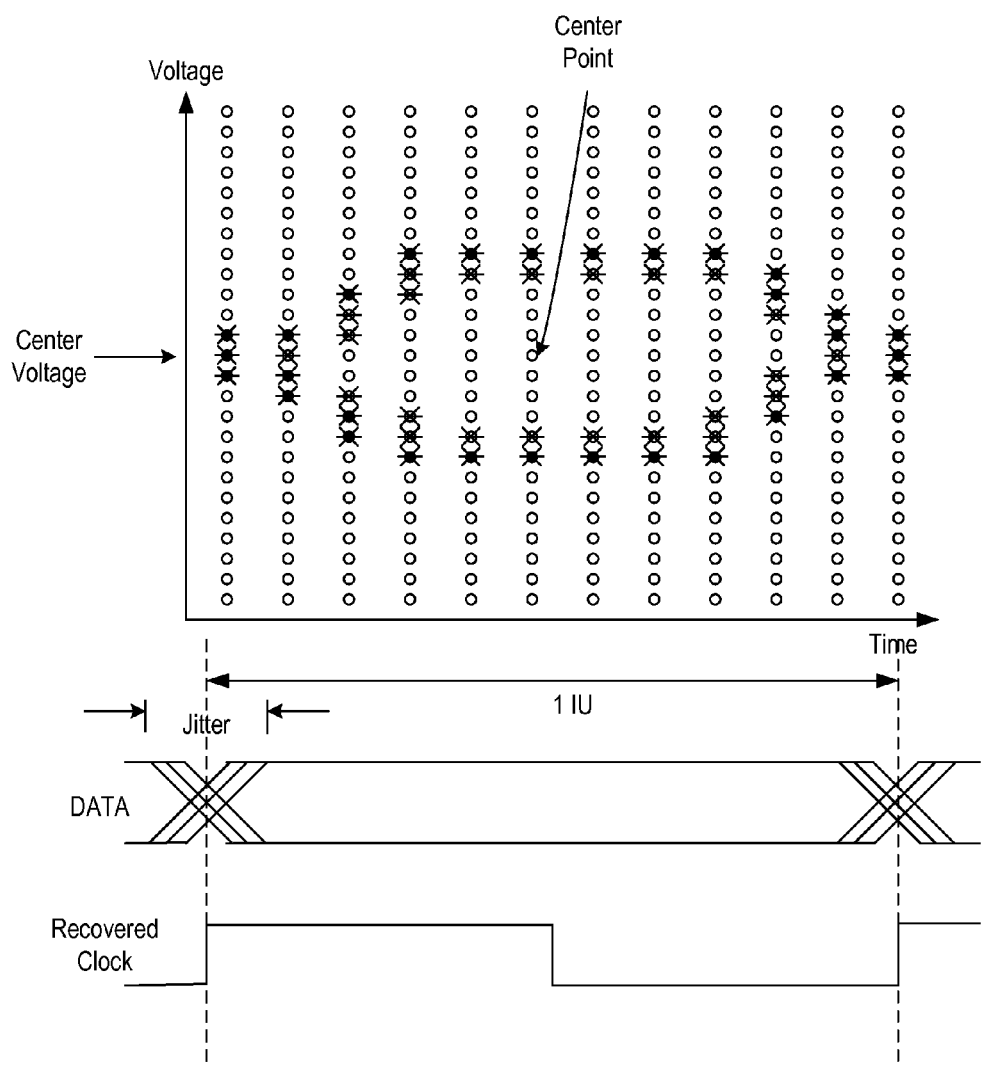
FIG. 4 is voltage versus time plot showing points of a contour of an eye pattern which are tested for valid data.

The capture flip-flop 328 samples a sequence of sampled symbols from the filtered signal on line 312 in the replica path 329. In particular, the capture flip-flop 328 is configured to detect a signal at a certain voltage and time offset of a given phase of the clock signal 330 so that points along the contour of the eye pattern can be tested. That is, rather than testing each point in a conventional manner in a voltage versus time plot as shown in FIG. 4, the capture flip-flop 328 is implemented to evaluate received data at points only along the contour of the eye pattern. The CDR circuit 334 is configured to control the sampling clock of the filtered signal on line 312 at a variable phase relative to a clock signal 330. The serial-in parallel-out buffer 342 generates a series of words from the sequence of sampled symbols captured by the capture flip-flop 330. The CDR circuit 334 uses these series of words to recover the clock of the incoming stream and use the phase interpolator 332 to align the sampling of the clock in the center of data transitions.

In one exemplary circuit, the communication signal 310 provides a sequence of symbols that is synchronized to the clock signal 330. The CDR circuit 334 includes a phase interpolator 332 configured to generate the variable sampling phase from a clock signal generated by the PLL 333 as a function of an offset value from the finite state machine (FSM) of CDR circuit 334 and a phase of the clock signal indicated by the eye-scan controller 308. In this example, the eye-scan controller 308 causes the sampling phase to set the offset value provided to the phase interpolator 333.

The eye-scan controller 308 and the CDR circuit 334 enable the receiver to test certain data points of the eye pattern to determine whether a given phase of the clock signal is acceptable for receiving data. After a first phase of a clock signal is selected and provided to the CDR circuit 334, the phase interpolator 333 will generate a clock signal that is an offset in time based upon a phase of the clock signal generated by the PLL 333. Accordingly, the capture flip-flop 328, the phase interpolator 332, and the eye-scan circuit 308 will enable testing of various points on the contour of an eye pattern. By adjusting both the voltage detected by the capture flip-flop 328 and an offset of the clock signal provided to the capture flip-flop 328, particular points on the contour of the eye can be detected until a complete eye pattern is identified. The operation of the CDR circuit 334 having the eye-scan controller 308 may be implemented as set forth in FIGS. 3 and 4, and according to the flowcharts of FIGS. 5-7, for example.

Turning now to FIG. 4, a voltage versus time plot shows points of a contour of an eye pattern which are tested for valid data, and particularly for pass/fail boundaries between detected valid data and detected invalid data. The voltage versus time plot of FIG. 4 represents 1 UI, where the phase of the clock signal to receive the data (i.e., the recovered clock) is selected to have a clocking transition near the center of the eye pattern. That is, data received near the ends of the UI generally experience more jitter, leading to more errors in the data transmission, as shown in FIG. 4. However, data received at the center of the eye pattern is more likely to be valid. Accordingly, it is desirable to identify the phase of the clock signal having a clocking transition edge near the center of the eye pattern to improve the reliability of the data transmission. The plot of FIG. 4 shows various points which could be tested, and particular points which are tested. That is, points which are tested and pass (i.e., indicate that valid data is received) have the star through the point, while points which are tested and fail also have the star through the point, but have a center which is filled (i.e., shown in black). Points which are not tested are shown as open circles. Those points do not need to be tested, because they will likely indicate valid data and provide no additional information regarding the location of the eye pattern.

Unlike a conventional circuit for determining the eye configuration of the data which tests all points in the plot, only points around a contour of the eye pattern are tested, as shown in FIG. 4. The eye pattern can be established by selectively moving horizontally and vertically within the plot after the end of the eye is established to identify transition from valid data to invalid data. However, fewer than all of the points along the contour need to be tested, as is described in more detail below. Even with testing all of the points on the contour of the eye pattern, only 53 points on the voltage versus time plot of FIG. 4 will need to be tested, compared to 300 overall points which would be tested using a conventional raster scanning check. It should be noted that the 300 points are shown by way of example to describe the contour of the eye pattern, and a plot having many more points could be implemented. As described above, because it is assumed that values in the center of the eye pattern are more likely to be passing, and values at the end of the eye pattern are more likely to be failing, finding the ends of the eye pattern can be used not only to determine the margin for receiving data, but also as a starting point for determining the contour of the eye pattern by identifying transitions from valid data to invalid data.

Since each point on the voltage versus time plot is discrete, the classification is made as pass or fail. Each discrete point is a combination of voltage offset (Y axis) and Time (X Axis) from the data sampling edge. A circuit implementing the contour eye-scan scans initial points to find the ends of the eye pattern, and the boundary points of the eye pattern are extracted using BER detection. If invalid data is detected at the center of the voltage versus time plot (i.e., valid data indicating that a zero value is not present at the center point), it can be assumed that the current phase of the clock signal is too far out of phase, and there is no need to determine whether the margins of the eye pattern are adequate to recover data. Rather, a new phase is selected without detecting both ends of the eye pattern. As is described in more detail below, assuming that valid data indicating that no data is received at the center of the eye, the ends of the eye are detected. A margin for the eye and optionally, the voltage range of the received signal, may then be determined based upon one or more points along the contour of the eye.

Figure 5:
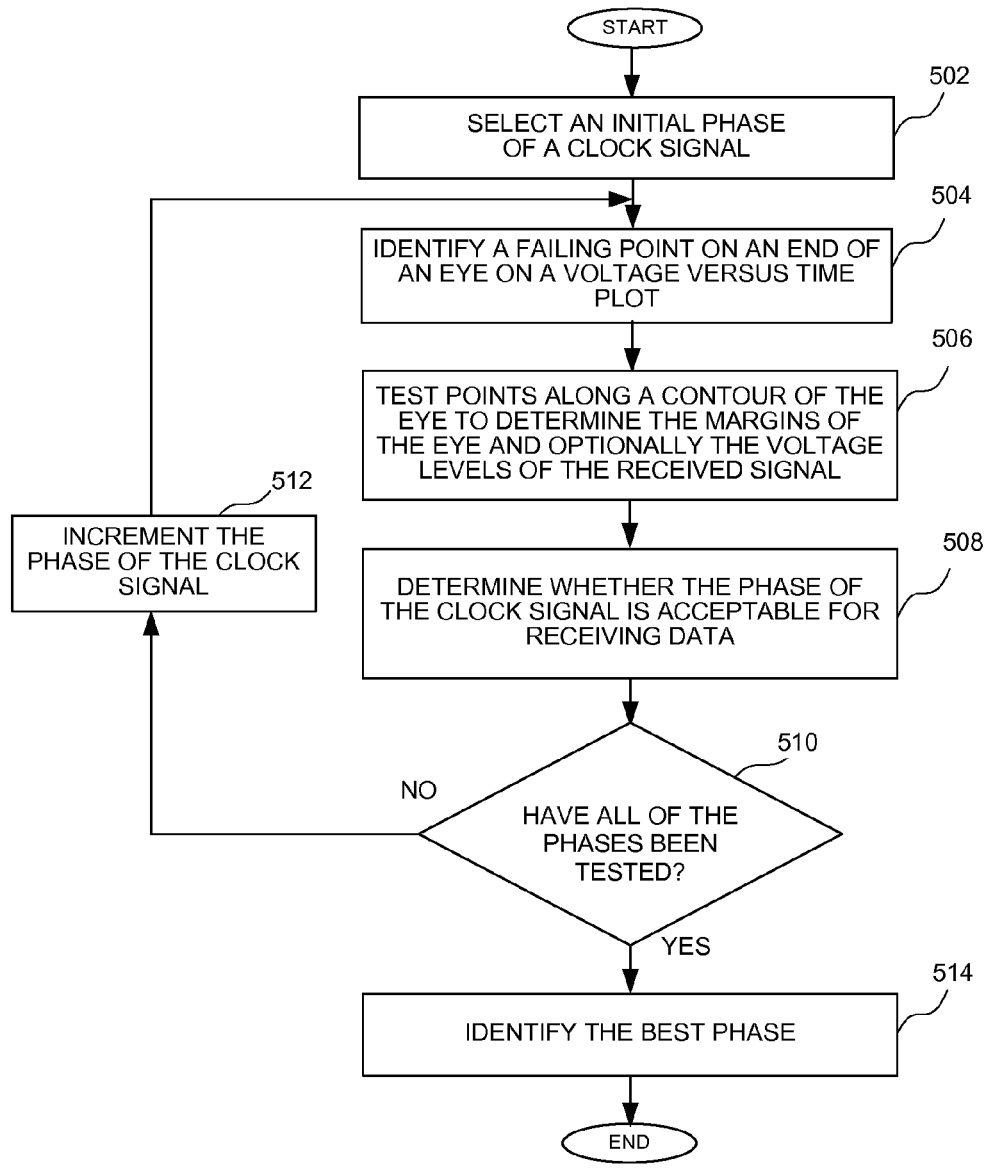
FIG. 5 is a flow chart showing a method of analyzing a phase of a clock signal.

Turning now to FIG. 5, a flow chart shows an exemplary method of analyzing a phase of a clock signal. An initial phase of a clock signal is selected at a block 502. Invalid data on an end of an eye pattern is identified on a voltage versus time plot at a block 504. Points along a contour of the eye pattern are tested to determine the margins of the eye pattern and the voltage levels of the received signal at a block 506. That is, the margins of the eye pattern are determined based upon the location of the two ends of the eye pattern, and the voltage levels of the received signals may be determined based upon detected upper and lower portions of the eye pattern. It is then determined whether the phase of the clock signal is acceptable for receiving data at a block 508. It is also determined whether all of the phases have been tested at a block 510. If not, the phase of the clock signal is then incremented at a block 512. After all of the phases have been tested, an optimal phase of the clock signal is identified for receiving data at a block 514.

A different number of points along the contour can be tested to determine the margins of the eye and optionally the voltage levels of the received signal, where the number of points being tested represents a tradeoff between accuracy of the scan results and scanning speed. In a most basic test, the margins of the eye pattern for a given phase of a clock signal could be determined. Additionally or alternatively, a voltage variation of the received signals can be determined based upon the voltage levels at the top and the bottom of the eye pattern. In one example, only three points need to be identified to determine the margins of the eye pattern for a given phase of the clock signal. In particular, a center point, i.e., a point at approximately the center of the voltage versus time plot of FIG. 4, is tested to determine whether the received data is valid. The center point would be selected to be at a voltage which is at approximately the center on the eye pattern, and a time which is approximately at the center of the UI for receiving data. The center point of the eye pattern is tested to determine whether the phase of the clock signal could possibly be a phase which might be used to receive data. Assuming that the center of the eye is determined to have valid data (i.e., a logical zero is detected at the center of the eye based upon a certain bit error rate), the endpoints of the eye pattern are determined. According to the various other embodiments, additional points along the contour of the eye may be tested to provide more detail about the contour of the eye, including the voltage variation of the received signal.

Figure 6:
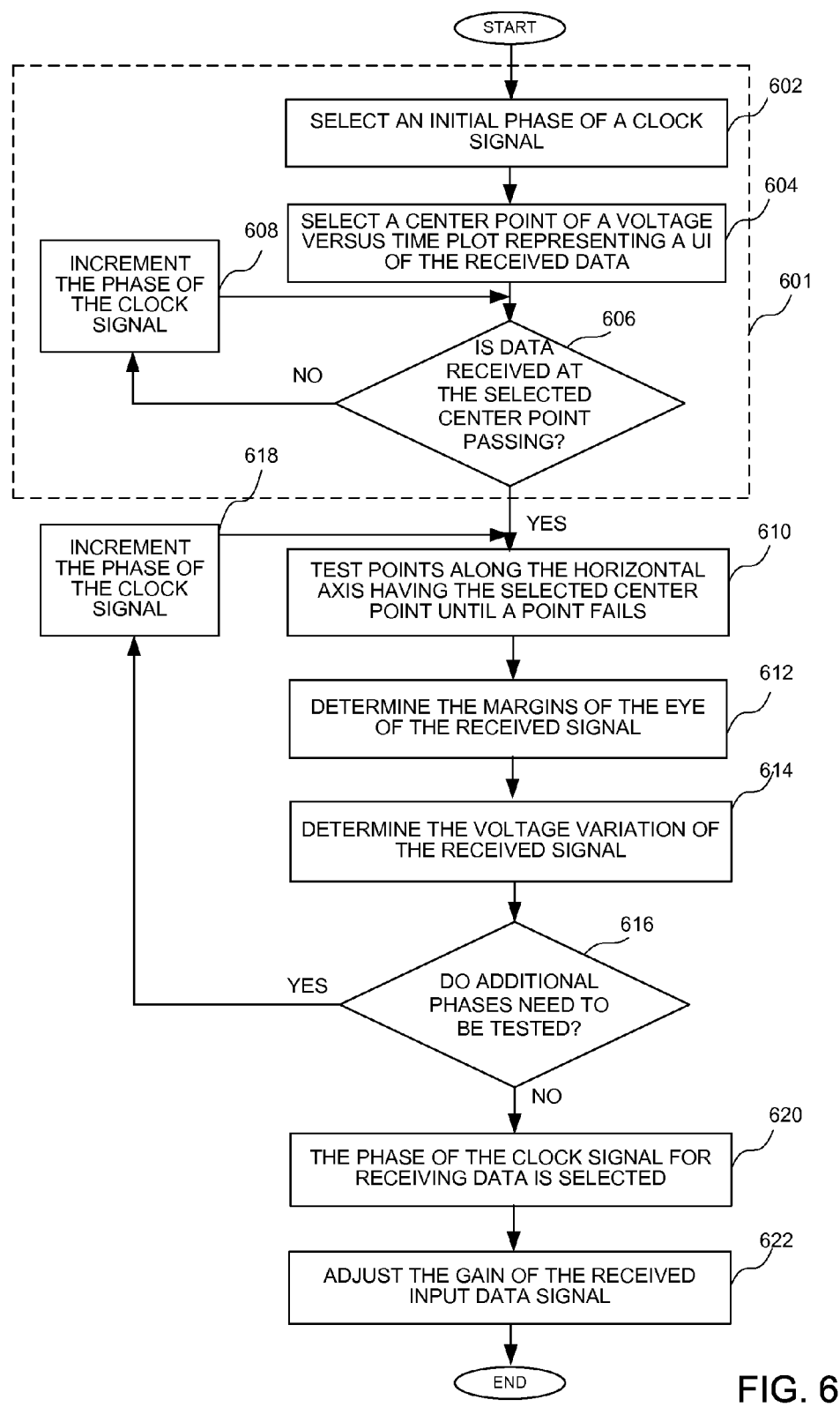
FIG. 6 is a flow chart showing a method of analyzing a phase of a clock signal.

Turning now to FIG. 6, a flow chart shows another exemplary method of analyzing a phase of a clock signal. A process 601 for generating a first phase of the clock signal is implemented before determining an optimal phase of a clock signal to be used for receiving data. In particular, a phase of the clock signal is selected at a block 602. A center point of a voltage versus time plot representing one UI of the received data is selected at a block 604. It is then determined whether data received at the selected center point is valid at a block 606. If not, the current phase of the clock signal is determined to be unsatisfactory for receiving data, the phase of the clock signal is incremented at a block 608.

If data is valid, points along the horizontal axis having the selected center point are tested until a point fails at a block 610. That is, the ends of the eye are determined by testing points along the time axis until the two ends points on either side of the center point are identified. Various calculations can then be made based upon the results of testing points along the horizontal axis. For example, the margins of the eye pattern of the received signal are determined at a block 612. The voltage variation of the received signal may also be determined at a block 614. As is described in more detail below, additional points along the contour of the eye pattern may be tested to determine the voltage variation of the received signal from invalid data detected at the top of the eye pattern and/or the bottom of the eye pattern. It is then determined whether additional phases need to be tested at a block 616. If so, the phase of the clock signal is incremented at a block 618. If not, the phase of the clock signal is used for receiving data is selected at a block 620. The gain of the received input data may be adjusted if necessary based upon the voltage variation of the received signal at a block 622.

Figure 7:
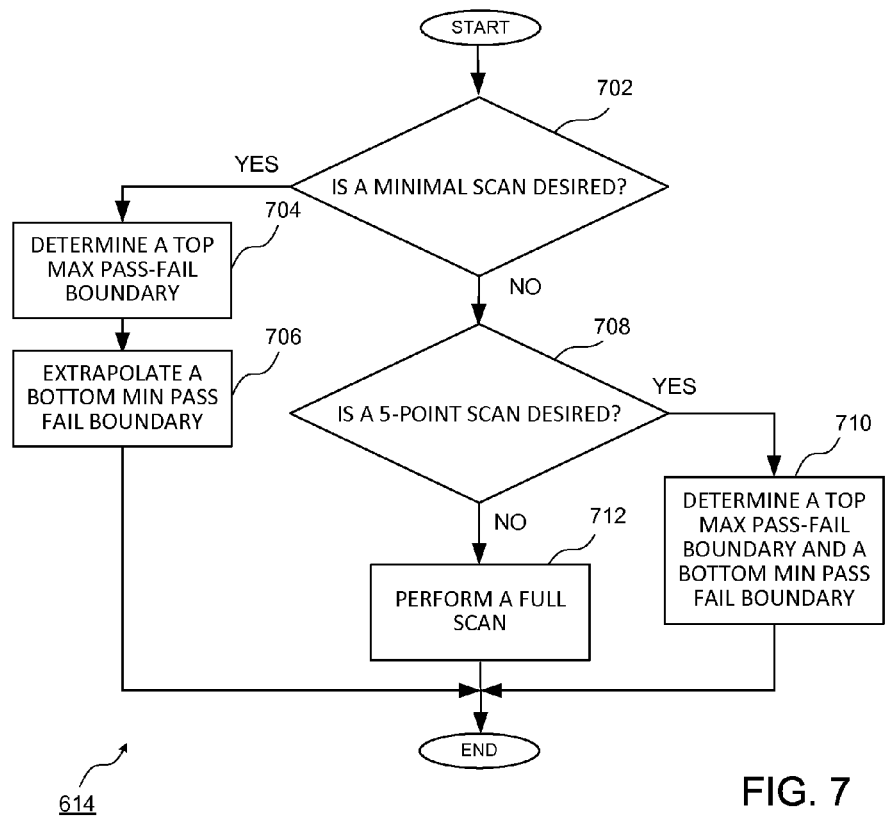
FIG. 7 is a flow chart showing a method of scanning points around a contour of an eye pattern.

Turning now to FIG. 7, a flow chart shows an exemplary method of scanning points around a contour of an eye pattern. In particular, it is first determined whether a minimal scan desired at a block 702. If so, a top maximum pass-fail boundary is determined at a block 704, and a bottom minimum pass fail boundary is extrapolated at a block 706. If a minimal scan is not desired, it is then determined whether a 5-point scan is desired at a block 708. If so, a top maximum pass-fail boundary and a bottom minimum pass fail boundary are determined at a block 710. Otherwise, a full scan Perform at a block 712. The full scan will enable the transitions between detected valid data points and invalid data points to determine the shape of the open eye of the eye pattern, where a point on a side of a tested point is selectively tested to detect the transitions. The selection of a method to determine the properties of the eye pattern can be considered as a tradeoff between the accuracy of the determinations and the requirements to test a certain number of points.

Figure 8:
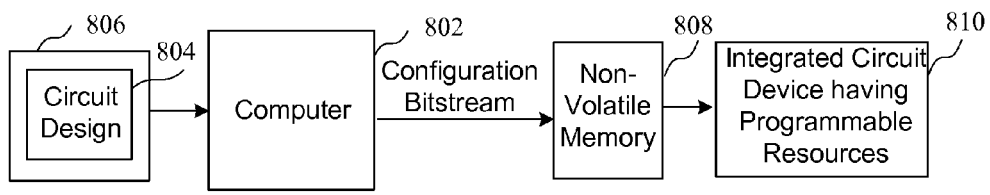
FIG. 8 is a block diagram of a system for programming a device having programmable resources.

Turning now to FIG. 8, a block diagram of a system for programming a device having programmable resources is shown. In particular, a computer 802 is coupled to receive a circuit design 804 from a memory 806, and generate a configuration bitstream which is stored in the non-volatile memory 808. As is described in more detail below, the circuit design may be a high level design, such as a circuit design defined in a hardware description language (HDL). Also, the computer may be configured to run software that generates a configuration bitstream which is stored in the non-volatile memory 808 and provided to an integrated circuit 810 which may be a programmable integrated circuit, such as the integrated circuit described below in FIG. 9.

The software flow for a circuit design to be implemented in a programmable integrated circuit comprises synthesis, packing, placement, and routing, as is well known in the art. Synthesis comprises the step of converting a circuit design in a high level design to a configuration of elements found in the programmable integrated circuit. For example, a synthesis tool operated by the computer 802 may implement the portions of a circuit design implementing certain functions in configurable logic blocks (CLBs) or digital signal processing (DSP) blocks, for example. An example of a synthesis tool is the ISE tool available from Xilinx, Inc. of San Jose Calif. Packing comprises the step of grouping portions of the circuit design into defined blocks of the device, such as CLBs. Placing comprises the step of determining the location of the blocks of the device defined during the packing step. Finally, routing comprises selecting paths of interconnect elements, such as programmable interconnects, in a programmable integrated circuit. At the end of place and route, all functions, positions and connections are known, and a configuration bitstream is then created. The bitstream may be created by a software module called BitGen, available from Xilinx, Inc. of San Jose, Calif. The bitstream is either downloaded by way of a cable or programmed into an EPROM for delivery to the programmable integrated circuit.

Figure 9:
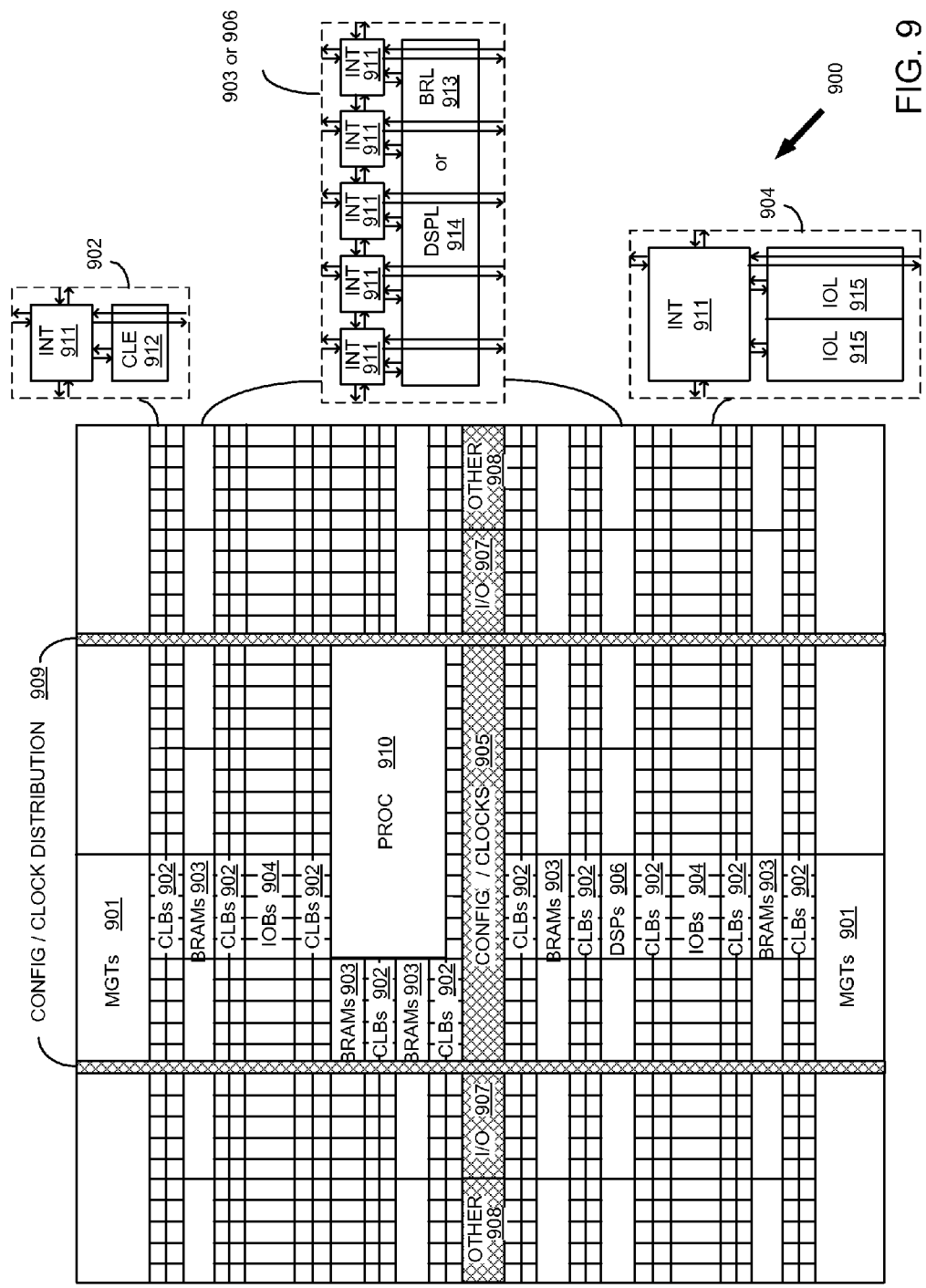
FIG. 9 is a block diagram of an integrated circuit having programmable resources.

Turning now to FIG. 9, a block diagram of an integrated circuit having programmable resources is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 9 comprises an FPGA architecture 900 having a large number of different programmable tiles including multi-gigabit transceivers (MGTs) 901, CLBs 902, random access memory blocks (BRAMs) 903, input/output blocks (IOBs) 904, configuration and clocking logic (CONFIG/CLOCKS) 905, digital signal processing blocks (DSPs) 906, specialized input/output blocks (I/O) 907 (e.g., configuration ports and clock ports), and other programmable logic 908 such as digital clock managers, analog-to-digital converters, system monitoring logic, and so forth. Some FPGAs also include dedicated processor blocks (PROC) 910, which may be used to implement a software application, for example.

In some FPGAs, each programmable tile includes a programmable interconnect element (INT) 911 having standardized connections to and from a corresponding interconnect element in each adjacent tile. Therefore, the programmable interconnect elements taken together implement the programmable interconnect structure for the illustrated FPGA. The programmable interconnect element 911 also includes the connections to and from the programmable logic element within the same tile, as shown by the examples included at the top of FIG. 9.

For example, a CLB 902 may include a configurable logic element (CLE) 912 that may be programmed to implement user logic plus a single programmable interconnect element 911. A BRAM 903 may include a BRAM logic element (BRL) 913 in addition to one or more programmable interconnect elements. The BRAM includes dedicated memory separate from the distributed RAM of a configuration logic block. Typically, the number of interconnect elements included in a tile depends on the height of the tile. In the pictured embodiment, a BRAM tile has the same height as five CLBs, but other numbers may also be used. A DSP tile 906 may include a DSP logic element (DSPL) 914 in addition to an appropriate number of programmable interconnect elements. An 10B 904 may include, for example, two instances of an input/output logic element (IOL) 915 in addition to one instance of the programmable interconnect element 911. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured embodiment, a columnar area near the center of the die is used for configuration, clock, and other control logic. The config/clock distribution regions 909 extending from this column are used to distribute the clocks and configuration signals across the breadth of the FPGA. Some FPGAs utilizing the architecture illustrated in FIG. 9 include additional logic blocks that disrupt the regular columnar structure making up a large part of the FPGA. The additional logic blocks may be programmable blocks and/or dedicated logic. For example, the processor block PROC 910 shown in FIG. 9 spans several columns of CLBs and BRAMs.

Note that FIG. 9 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 9 are purely exemplary. For example, in an actual FPGA more than one adjacent column of CLBs is typically included wherever the CLBs appear in order to facilitate the efficient implementation of user logic. While the embodiment of FIG. 9 relates to an integrated circuit having programmable resources, it should be understood that the circuits and methods set forth in more detail below could be implemented in any type of ASIC.

In one embodiment, an MGT 901 includes the characterized receiver and certain CLBs 902 are configured to implement the eye-scan controller and the PRBS data checker using error indications stored in a BRAM 903.

Figure 10:
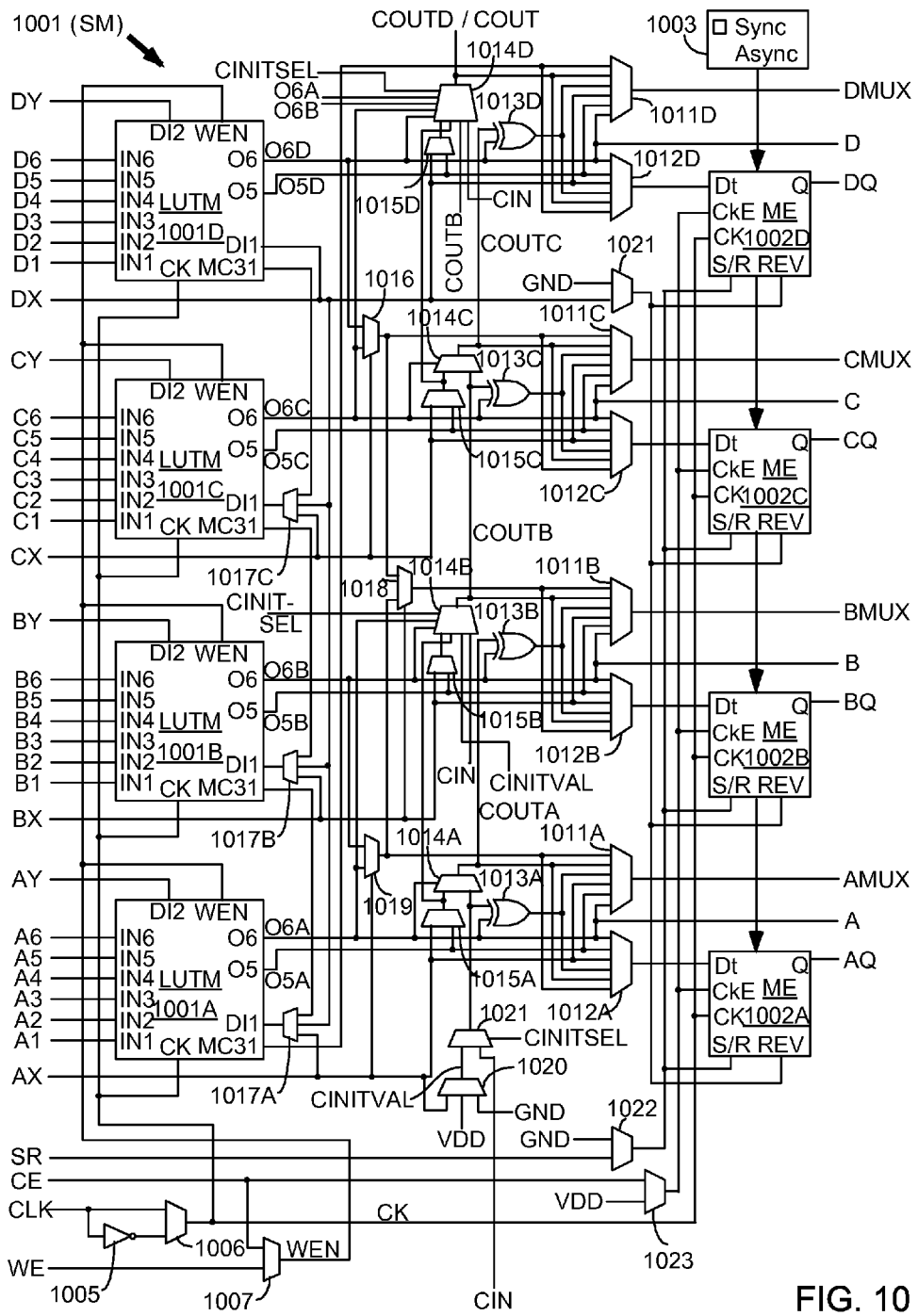
FIG. 10 is a block diagram of a configurable logic element of the integrated circuit of FIG. 9.

Turning now to FIG. 10, a block diagram of a configurable logic element of the integrated circuit of FIG. 9 is shown. In particular, FIG. 10 illustrates in simplified form a configurable logic element of a configuration logic block 902 of FIG. 9 In the embodiment of FIG. 10, slice M 1001 includes four lookup tables (LUTMs) 1001A-1001D, each driven by six LUT data input terminals A1-A6, B1-B6, C1-C6, and D1-D6 and each providing two LUT output signals O5 and O6. The O6 output terminals from LUTs 1001A-1001D drive slice output terminals A-D, respectively. The LUT data input signals are supplied by the FPGA interconnect structure via input multiplexers, which may be implemented by programmable interconnect element 1011, and the LUT output signals are also supplied to the interconnect structure. Slice M also includes: output select multiplexers 1011A-1011D driving output terminals AMUX-DMUX; multiplexers 1012A-1012D driving the data input terminals of memory elements 1002A-1002D; combinational multiplexers 1016, 1018, and 1019; bounce multiplexer circuits 1022-1023; a circuit represented by inverter 1005 and multiplexer 1006 (which together provide an optional inversion on the input clock path); and carry logic having multiplexers 1014A-1014D, 1015A-1015D, 1020-1021 and exclusive OR gates 1013A-1013D. All of these elements are coupled together as shown in FIG. 10. Where select inputs are not shown for the multiplexers illustrated in FIG. 10, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 10 for clarity, as well as from other selected figures herein.

In the pictured embodiment, each memory element 1002A-1002D may be programmed to function as a synchronous or asynchronous flip-flop or latch. The selection between synchronous and asynchronous functionality is made for all four memory elements in a slice by programming Sync/Asynch selection circuit 1003. When a memory element is programmed so that the S/R (set/reset) input signal provides a set function, the REV input terminal provides the reset function. When the memory element is programmed so that the S/R input signal provides a reset function, the REV input terminal provides the set function. Memory elements 1002A-1002D are clocked by a clock signal CK, which may be provided by a global clock network or by the interconnect structure, for example. Such programmable memory elements are well known in the art of FPGA design. Each memory element 1002A-1002D provides a registered output signal AQ-DQ to the interconnect structure. Because each LUT 1001A-1001D provides two output signals, O5 and O6, the LUT may be configured to function as two 5-input LUTs with five shared input signals (IN1-IN5), or as one 6-input LUT having input signals IN1-IN6.

In the embodiment of FIG. 10, each LUTM 1001A-1001D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 1017A-1017C for LUTs 1001A-1001C), or to the two 32-bit RAMs via input terminals DI1 and DI2. RAM write operations in the LUT RAMs are controlled by clock signal CK from multiplexer 1006 and by write enable signal WEN from multiplexer 1007, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 1001A may also be provided to the general interconnect structure for shift register chaining, via output select multiplexer 1011D and CLE output terminal DMUX. Accordingly, the circuits and methods set forth above may be implemented in a device such as the devices of FIGS. 9 and 10, or any other suitable device.

The invention is thought to be applicable to a variety of systems for characterizing a receiver. Other aspects and embodiments will be apparent to those skilled in the art from consideration of the specification. The embodiments may be implemented as one or more processors configured to execute software, as an application specific integrated circuit (ASIC), or as a logic on a programmable logic IC, for example. It is intended that the specification and illustrated embodiments be considered as examples only, with a true scope and spirit of the invention being indicated by the following claims.

What is claimed is:

1. A method of analyzing a phase of a clock signal for receiving data, the method comprising:
    establishing an end of an eye pattern associated with received data;
    testing points to establish a margin for an opening of the eye pattern;
    selectively moving horizontally and vertically, from the end of the eye pattern, along a voltage versus time plot after the end of the eye pattern is established to identify transitions between valid data and invalid data;
    establishing a contour of the eye pattern using the selectively scanned points; and
    determining whether the phase of the clock signal is acceptable for receiving the received data.

2. The method of claim 1, further comprising identifying an invalid data point at a center point of the voltage versus time plot.

3. The method of claim 2, wherein the phase of the clock signal is determined to be unacceptable for receiving data if data received at the center point of the voltage versus time plot is determined to be invalid.

4. The method of claim 1, wherein testing points comprises identifying invalid data points along a time axis from a center point of the voltage versus time plot to identify two ends of the eye pattern.

5. The method of claim 1, further comprising identifying an invalid data point at a top of the eye pattern, and determining a voltage range of received data from the invalid data point at the top of the eye pattern.

6. The method of claim 1, wherein:
    testing points comprises identifying invalid data points along the time axis from a center point of the voltage versus time plot to identify two ends of the eye pattern, and identifying invalid data points at a top and a bottom of the eye pattern; and
    the method further comprises determining a voltage range of received data from voltages at the invalid data points at the top and bottom of the eye pattern.

7. The method of claim 1, wherein:
    testing points comprises testing a plurality of points above a center voltage of the voltage versus time plot to determine the contour of a top portion of the eye pattern; and
    the method further comprises determining a voltage range of received data from invalid data points at the top of the eye pattern.

8. The method of claim 7, further comprising testing a plurality of points below the center voltage to determine the contour of a bottom portion of the eye pattern.

9. A method of analyzing a phase of a clock signal for receiving data, the method comprising:
    scanning points along a time axis of a voltage versus time plot to identify a first end of an eye pattern;
    scanning points along the time axis of the voltage versus time plot to identify a second end of the eye pattern;
    determining whether a phase of the clock signal is acceptable for receiving data;
    selectively moving horizontally and vertically along the voltage versus time plot, after the first and second ends of the eye pattern are established, by scanning points along a voltage axis of the voltage versus time plot to identify a first voltage of the eye pattern by identifying transitions between valid data and invalid data;
    selectively moving horizontally and vertically along the voltage versus time plot, after the first and second ends of the eye pattern are established, by scanning points along the voltage axis of the voltage versus time plot to identify a second voltage of the eye pattern by identifying transitions between valid data and invalid data;
    establishing a contour of the eye pattern using the selectively scanned points; and
    determining a voltage variation of received data.

10. The method of claim 9, further comprising determining a margin for the received data based upon a location of the first end of the eye pattern and a location of the second end of the eye pattern.

11. The method of claim 10, wherein determining whether a phase of the clock signal is acceptable for receiving data comprises evaluating the margin for the received data.

12. The method of claim 9, wherein determining whether a phase of the clock signal is acceptable for receiving data comprises determining whether data received at a center point is invalid.

13. The method of claim 9, wherein scanning points along the voltage axis comprises determining a transition from valid data received at a first point along the voltage axis to invalid data received at a second point along the voltage axis.

14. The method of claim 9, further comprising determining an optimal phase of a plurality of phases of a clock signal for receiving data.

15. A circuit for analyzing a phase of a clock signal for receiving data, the circuit comprising:
   a circuit generating a phase of a clock signal; and
   a clock and data recovery circuit coupled to receive data and the phase of the clock signal;
   wherein the clock and data recovery circuit identifies an end of an eye pattern and selectively tests points, from the end of the eye pattern, along a contour of the eye pattern by selectively moving horizontally and vertically along a voltage versus time plot after the end of the eye pattern is established to identify transitions between valid data and invalid data, wherein the transitions between valid data and invalid data enable determining whether the phase of the clock signal is acceptable for receiving data and establishing a contour of the eye pattern using the selectively tested points.

16. The circuit of claim 15, wherein testing points along a contour of the eye pattern comprises identifying invalid data points along the time axis from a center point of the voltage versus time plot to identify two ends of the eye pattern.

17. The circuit of claim 16, wherein the clock and data recovery circuit further enables identifying an invalid data point at a top of the eye pattern, and determining a voltage range of received data from the invalid data point at the top of the eye pattern.

18. The circuit of claim 16, wherein the clock and data recovery circuit further enables identifying invalid data points at a top and a bottom of the eye pattern, and determining a voltage range of received data from the voltages at the invalid data points at the top and the bottom of the eye pattern.

19. The circuit of claim 15, wherein:
   testing points along a contour of the eye pattern comprises testing a plurality of points above a center voltage to determine a contour of a top portion of the eye pattern; and
   the clock and data recovery circuit further enables determining a voltage range of received data from invalid data points at the top of the eye pattern.

20. The circuit of claim 19, wherein testing points along a contour of the eye pattern further comprises testing a plurality of points below the center voltage to determine a contour of a bottom portion of the eye pattern.

* * * * *